Nov. 13, 1962     O. W. DILLON     3,063,340
BEVEL-EDGED LENSES

Filed Dec. 19, 1958     3 Sheets-Sheet 1

INVENTOR
OSCAR W. DILLON
BY
*Louis L. Gagnon*
ATTORNEY

Nov. 13, 1962   O. W. DILLON   3,063,340
BEVEL-EDGED LENSES

Filed Dec. 19, 1958   3 Sheets-Sheet 2

INVENTOR
OSCAR W. DILLON
BY
Louis L. Gagnon
ATTORNEY

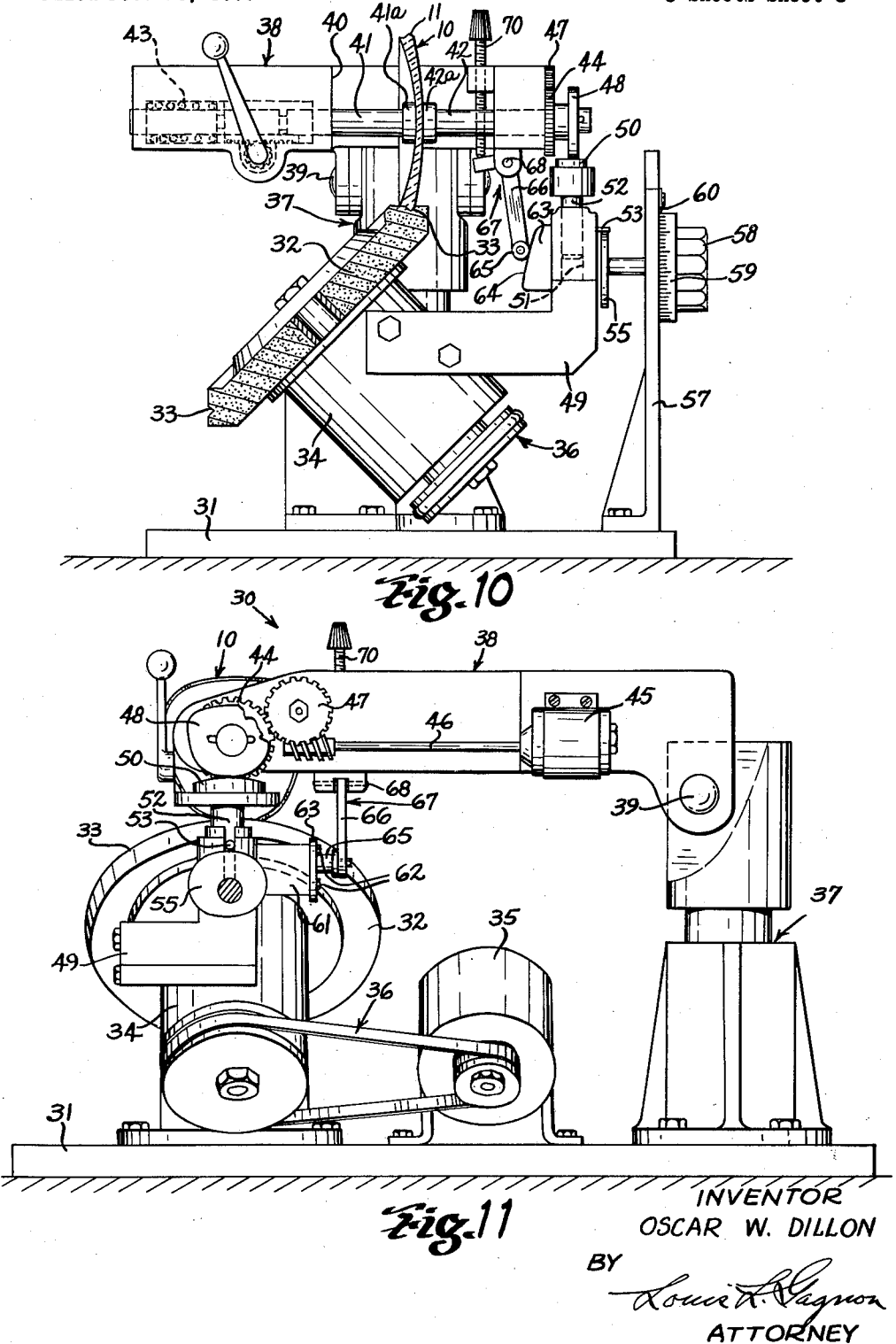

3,063,340
BEVEL-EDGED LENSES
Oscar W. Dillon, Sturbridge, Mass., assignor to American Optical Company, Southbridge, Mass., a voluntary association of Massachusetts
Filed Dec. 19, 1958, Ser. No. 781,706
3 Claims. (Cl. 88—54)

This invention relates to improvements in bevel-edged lenses and method of making the same and has particular reference to a method by which the peripheral edge portions of lenses of all sizes and/or thicknesses may be contoured to different desired shapes and simultaneously provided with a mounting surface therearound having an outwardly projecting bevel thereon of a controlled substantially uniform angle and height such as to be concealed by the mountings in which the lenses are to be supported in position of use.

When in use, ophthalmic lenses are most commonly supported in mountings of the frame type having lens rims with internal relatively shallow circumferential bevelled channels adapted to receive the peripheral edge portions of the lenses which are, in turn, bevelled to fit within the channels.

In ophthalmic mountings of the type embodying metal lens rims the said rims are formed to a minimum width and, therefore, in most instances have a front-to-back dimension somewhat less than that of the edge thickness of the lenses to be mounted therein. Because of this the surfaces of the beveled edges of the lenses or at least portions thereof extend considerably rearwardly and/or forwardly of the planes of the respective sides of the rims when mounted therein. This condition obviously becomes more pronounced when lenses, particularly of a strong minus value, are to be mounted in conventional ophthalmic mountings since the edge thickness of such lenses increases with the increase of their size and prescriptive power.

Due to the fact that all lenses, regardless of their edge thicknesses, were sized and provided with a continuous bevel of a particular controlled angle such as to fit properly within the grooved rims of the mountings, it is obvious that with minus lenses having said particular continuous angle of bevel formed thereon, the width of the side surfaces of the bevel greatly increased and became more visible outside of the grooves in the lens rims as the edge thicknesses, sizes and prescriptive powers of the lenses increased. This increase in visibility of said side surfaces has, in the past, been very undesirable from an aesthetical point of view and, because such surfaces are inherently of a translucent nature, they were further undesirable as they reduced the usable viewing area of the lenses and also caused discomforting diffusion of peripheral light and were physically annoying to the wearer. Individuals requiring such lenses, in most instances, cannot see without their glasses and were, therefore, forced to endure such inconveniences.

Various attempts have been made heretofore to reduce the visible area of the surfaces of the bevel either by reducing the angle of the bevel on thick lenses or by placing the apex of the bevel adjacent the front surface of the lens. It has been found from past experience, however, that a secure mounting of lenses, particularly of the thick or heavy type, cannot be accomplished with lens edge bevels which are reduced beyond a point where the included angle of bevel becomes greater than 115° for the reason that such shallow bevels will not permit enough of the material of the lens edges to fit within the mounting rims of spectacle fronts and the gripping action of the receiving channels of the rims will not be sufficient to prevent displacement of the lenses during normal usage of the spectacles.

Furthermore, upon placing the apex of the lens edge bevel adjacent the front surface of the lens, as has been done heretofore, the area of the bevelled surface at the rear of the lens is greatly increased and is, of course, visible through the mounted lens thereby again producing the above-discussed undesirable results. In a further attempt to reduce the visible bevelled area of mounted lenses, the apex of the lens edge bevel has been positioned centrally of the edge thickness of the lens at all points about the circumference of the lens. While this method equally divides the front and back surface areas of the bevel, it leads to serious mounting problems in lenses having curvature other than spherical as the apex of the bevel deviated considerably from the desired general or average plane of the lens surfaces, thereby requiring that the lens-retaining rims of the mountings be bent or otherwise deformed differently from their initially formed shapes in order to accommodate for such deviations and was very undesirable.

The present invention is directed to overcoming all of these prior art difficulties by forming the lens edge with a bevel of a standard angle closely adjacent the front surface of the lens in the general plane of the lens surfaces and to a depth only sufficient to be substantially completely contained within the channeled portion of the lens rim when mounted therein while simultaneously forming the remainder of the lens edge surface substantially flat and substantially parallel to the axis of the lens. This produces lenses having front and rear optical surfaces of a peripheral dimension substantially equal to the inner dimension of the rims thereby permitting a secure mounting of the lenses in the rims while eliminating the visible bevelled edge portions thereof which were common with conventional bevel edging techniques.

It, therefore, is a principal object of the invention to provide a simple, efficient, highly effective and novel bevel-edged lens and method of making the same wherein lenses of all sizes, shapes and edge thicknesses may be provided with equally angled bevelled edge portions of predetermined equal heights at all points circumferentially of the lenses.

Another object is to provide bevel-edged lenses of the above character and method of making the same wherein the optically finished opposite surfaces of said lenses are controlled to be substantially equal in their outer peripheral dimension to that of the inner dimension of lens supporting rims of ophthalmic mountings in which said lenses are to be mounted.

Another object is to provide a lens bevel-edging technique by which lenses of all sizes, shapes, edge thicknesses and prescriptive powers may be provided with bevelled edges of any desired angle and wherein the side edges of the bevel in all cases are controlled circumferentially at all points about the lens edge to be substantially equal in depth and the width of the bevel at its base or widest portion is such as to substantially equal the width of the inner circumferential channels of lens rims of spectacle frames in which the lenses are to be supported.

Another object is to provide a lens having a bevelled circumferential edge portion of a predetermined constant depth adjacent the front or spherical convex side thereof and a flat circumferential edge portion extending rearwardly from said bevelled portion, the outer side surface of which is located at predetermined radial distances from the axis of the lens such as to substantially equally proportion and dimension the front and rear optically finished side surfaces on said lens.

Another object is to provide an improved bevel-edged lens particularly of the type having relatively thick outer edges and method of making the same which when supported in mountings of the type having lens-retaining rims will have its bevelled edges substantially completely concealed by said rims to provide maximum viewing area through said lens.

Another object is to provide a bevel-edged lens of the above character wherein sufficient clearance is provided for the adjustable nose pad supporting arms of the conventional type used with spectacles having metallic lens rims.

A further object is to provide bevel-edged lenses of the above character which, when supported in position of use in spectacle frames, will enhance the cosmetic appearance of the resultant ophthalmic mounting by substantially eliminating visible evidence of the usual bevelled edge portions of the lenses when the mounting is viewed from the front.

Other objects and advantages of the invention will become apparent from the following description when taken in conjunction with the accompanying drawings in which:

FIG. 10 is a diagrammatic front elevational view of a machine for forming bevelled lenses in accordance with the invention;

FIG. 11 is a side elevational view of the machine shown in FIG. 10; and

Figure 1:
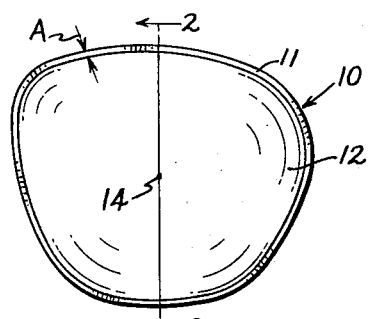
FIG. 1 is a front elevational view of a lens formed in accordance with the invention.
Figure 2:
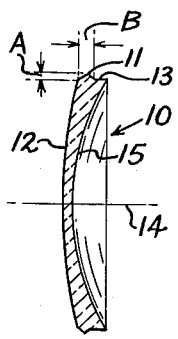
FIG. 2 is a cross-sectional view taken substantially on line 2—2 of FIG. 1 and looking in the direction of the arrows.
Figure 3:
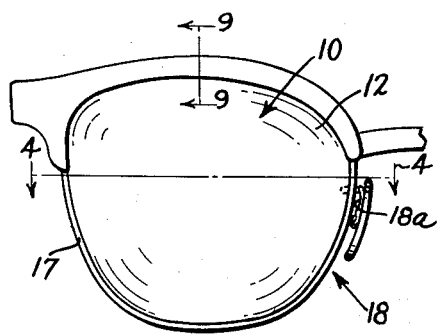
FIG. 3 is a fragmentary front elevational view of a spectacle front having a lens of the type embodying the invention mounted therein.
Figure 4:
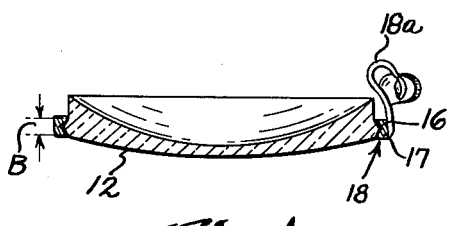
FIG. 4 is a transverse cross-sectional view taken substantially on line 4—4 of FIG. 3.

Referring more particularly to the drawings wherein like characters of reference designate like parts throughout the several views, there is illustrated in FIGS. 1 and 2 a typical ophthalmic lens 10 having its peripheral edge portion formed in accordance with the invention. For purposes of illustration, the lens 10 has been shown as being of strong negative power wherein its peripheral edge is of considerable front-to-back thickness. The edge of the lens 10 is provided with an outwardly directed bevel 11 adjacent its forward or convex side 12 and a flat rearwardly directed portion 13 which is substantially parallel to the axis 14 of the lens 10 and extends from the bevel 11 to the rear or convex side 15 of the lens. The height or depth A of the bevel 11 is controlled to be substantially constant throughout the circumference of the lens 10 and such as to produce a dimension B across its base (see FIG. 2) which is approximately equal to the width of a channel or groove 16 in an eyewire or rim part 17 of an ophthalmic mounting such as 18 (see FIGS. 3 and 4) in which the lens 10 is to be mounted for use. Thus, when the lens 10 is properly supported in the ophthalmic mounting, as illustrated in FIGS. 3 and 4, it will be seen that the outer peripheral dimension of the front and back surfaces 12 and 15, respectively, of the lens 10 will be substantially equal to the inner peripheral dimension of the rim 17 and no or little evidence of the bevelled edge of the lens will be seen when the mounting 18 is viewed from either the front or the back.

This, of course, is the ideal condition in mounted ophthalmic lenses of this type and one that had been strived for in the ophthalmic art but has not been attained in any practical manner heretofore, particularly when dealing with lenses having thick edge portions. As mentioned above, it has been found from past experience that the angle of the bevel on ophthalmic lens edges should be no greater than an included angle of 115° since a shallower bevel will not permit an adequate amount of the material of the lens edge to fit within the grooved rim portions of conventional ophthalmic mountings and a positive and secure gripping of the lens by the rim will not result. Various angles of bevel are used in the channels of lens rims depending upon the particular type of mounting in which the lenses are to be placed but, in all cases, it is customary to use a lens rim having a lens-receiving channel bevelled to an included angle less than that of the included angle of the bevel of the lens whereby the apex of the lens bevel will, in no instance, engage the base of the bevel in the lens rim. An included angle of bevel of approximately 90° is commonly used in the lens rims of ophthalmic mountings, particularly those formed of non-metallic materials.

For purposes of clearly illustrating the undesirable effects resulting from prior art lens bevel edging techniques and more particularly for purposes of clearly illustrating the advantages of the present invention, there has been shown in FIGS. 5, 6, 7 and 8 typical examples of lenses which are bevel-edged by conventional methods as compared to the lens 10 of the invention which is of the same size, shape and edge thickness. As stated hereinabove, strong negative lenses have been shown for purposes of illustration and it is to be understood that the conventional undesirable extension of the sides of the lens edge bevels toward the centers of lenses which will be hereinafter described in detail will exist in various degrees for all lenses regardless of their power wherein their edge thicknesses are greater than the front-to-back dimension of the lens rims of spectacles in which they are to be mounted.

Figure 5:
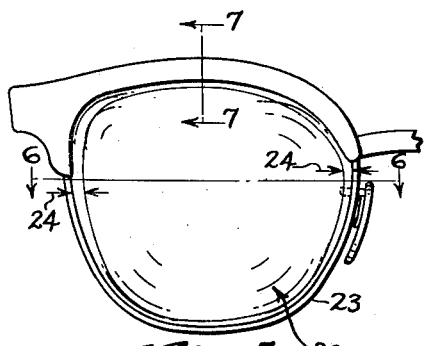
FIG. 5 is a fragmentary front elevational view of a spectacle front similar to FIG. 3 but having a lens mounted therein which has been bevel-edged by prior art methods.
Figure 6:
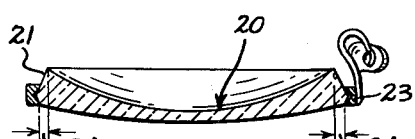
FIG. 6 is a transverse cross-sectional view taken substantially on line 6—6 of FIG. 5.
Figure 7:
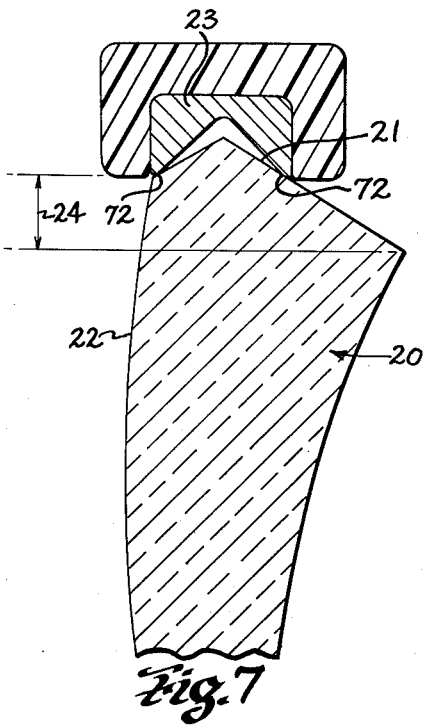
FIG. 7 is a greatly enlarged vertical fragmentary cross-sectional view taken substantially on line 7—7 of FIG. 5 looking in the direction of the arrows.

In referring more particularly to FIGS. 5, 6 and 7 wherein the lens 20 is provided with the usual bevelled edge 21 having an included angle of bevel of approximately 115°, it can be seen that the front and rear sides of the bevel extend from its apex in opposite directions to their respective adjacent front and rear surfaces of the lens 20. In the case illustrated in FIGS. 5, 6 and 7, the apex of the bevel 21 has been so located toward the front surface 22 of the lens as to cause the outer peripheral dimension of said front surface to be substantially equal to that of the inner peripheral dimension of the lens rim 23 in which the lens is mounted. In so doing, however, the rearwardly directed side surface of the bevel 21 has been greatly extended downwardly toward the center or axis of the lens. While the front surface of the bevel has been adjusted in depth to provide the ideal condition wherein it is substantially completely concealed by the lens rim 23, the area of exposure of the rear surface of the bevel has been greatly increased and extends considerably inwardly beyond the rim 23. Obviously, its visibility through the lens 20, when viewed from the front, has been greatly increased and thereby causes the lens 20 to appear as having a band or visible translucent portion 24 around the periphery thereof.

This translucent portion is extremely unattractive as well as disturbing to the wearer for the reasons mentioned hereinabove. The visible band 24, will, of course, vary in width and size in accordance with the difference in edge thicknesses of lenses and in acordance with the particular shape or outer contour of the lenses. In all cases wherein the edge thickness of the lens 20 is greater than the front-to-back dimension of the rim 23, a part of the bevelled portion 21 of the lens 20 will be visible when the lens 20 is mounted in a spectacle frame or the like.

Figure 8:
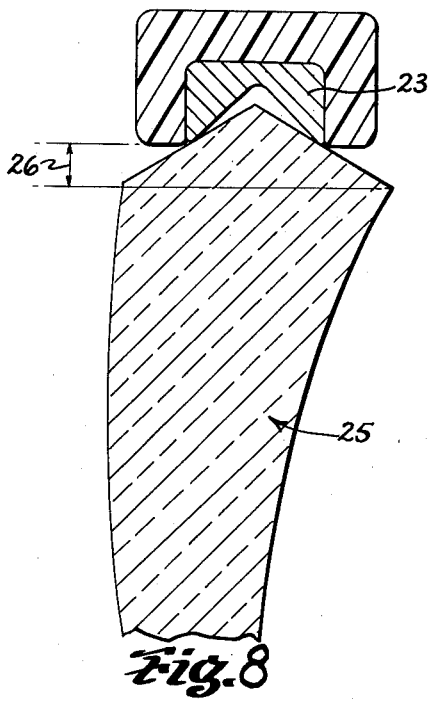
FIG. 8 is a view similar to FIG. 7 of a lens mounted in a spectacle frame illustrating a different form of prior art bevelled edge on the lens.

In an attempt to reduce the size or thickness of the above-mentioned visible band or translucent portion 24 in ophthalmic mountings, lenses 25 such as shown in FIG. 8 have previously been bevel-edged in such manner as to locate the apex of the bevel centrally of the thickness of the lens edge so as to divide the band or exposed portion of the bevel equally on each side of the lens. This reduces the thickness of the exposed portion of the bevel when the lens is mounted, as can be seen when comparing FIGS. 7 and 8, but, again, it does not eliminate the undesirable condition wherein the bevel is still visible adjacent the inner peripheral edge of the rim of the mounting except in instances where the edge thickness of the lens is substantially equal to the front-to-back dimension of the rim.

While the sides of a bevel on the edge of a lens may be divided equally by placing the apex centrally of the lens edge thickness, as shown in FIG. 8, this method of bevel-edging lenses is usually avoided since it leads to serious mounting problems as discussed hereinabove due to the resultant excessive wandering from side-to-side of the apex of the bevel relative to the general or average plane of the lens surfaces.

Due to the fact that the rims of spectacle frames are most generally shaped or coquilled to an average lens base curvature such as, for example, 6 diopters, and which in most instances is placed on the front side of the lens, particularly with lenses of the fused bifocal type, it is preferable to locate the apex of the bevel on the lenses in such manner as to follow as closely as possible to the front or convex side of the lens (see FIGS. 1-6 and 8). In so doing, the lens is fitted properly in the rims of spectacles with little or no reshaping of said rims being required. Lenses which are bevel edged as shown in FIG. 8, however, usually require individual bending and time-consuming fitting of the rims with the lenses.

Figure 9:
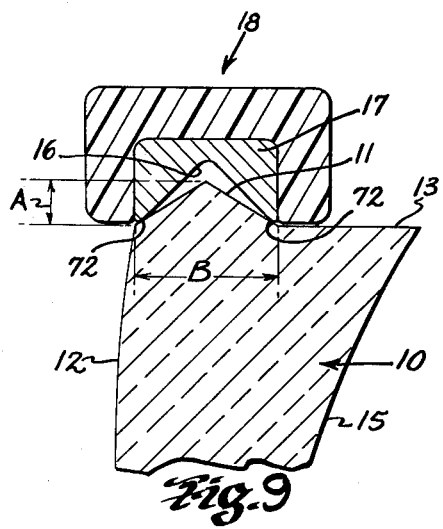
FIG. 9 is a greatly enlarged fragmentary cross-sectional view taken substantially on line 9—9 of FIG. 1 looking in the direction of the arrows.

It can be seen in FIG. 4 and more clearly in FIG. 9 that by edging the lens 10 in the manner taught by this invention, the bevel 11 is placed adjacent the front or convex side 12 of the lens to permit a quick and simple as well as accurate fitting of the lens in standard spectacle frames regardless of the lens edge thickness or variations in its thickness about its circumference which might result from different prescriptive characteristics of the lenses as would, for example, be the case where strong cylinder lenses are used. In addition to the placing of the apex of the bevel adjacent the front surface 12 of the lens 10, its rearwardly directed flat edge part 13 provides the rear surface 15 of the lens 10 with an outer peripheral dimension substantially equal to that of the front surface 12 thereof and by controlling the depth of the bevel 11, as will be described in detail hereinafter, so as to cause the inner peripheral edge of the rim 17 to be located adjacent said flat edge part 13 when the lens is mounted (see FIG. 9), substantially no visible evidence of the bevel 11 will be had when the lens is properly mounted as shown in FIGS. 3, 4 and 9. It is further pointed out that by forming the flat edge part 13 so that it extends rearwardly of the base of the beveled edge part 11 sufficient clearance for the adjustable nose pad supporting arms 18a, as shown in FIG. 4, is provided and a more positive seating of the beveled groove in the rim with said beveled edge part of the lens is insured.

It is pointed out that the particular type of spectacle frame illustrated in the drawings has been given only for purposes of illustrating the invention and that the featured lens edge shape of this invention may be used to equal advantage in other types of mountings such as, for example, the well-known non-metallic type of spectacles. Moreover, in camera objectives or other types of lens mounts wherein it is of importance to provide as large a lens aperture as possible without any obstructing peripheral bevelled edge portions of the lens being in the light path through the mount, the lens edging technique of the present invention will provide secure and accurate means for mounting such lenses.

While lenses having bevelled edges of the character of this invention may be formed by several differently designed bevel edging machines, there is shown diagrammatically in FIGS. 10 and 11 an edging machine 30 which is particularly adapted to most efficiently and accurately simultaneously produce the featured bevel edge part 11 and flat edge part 13 of the lens of the invention.

The machine 30, having a base 31, is provided with a disc-shaped abrading wheel 32 having a rim or outer portion therearound in which is provided a V-groove 33 which is formed to the angle of bevel 11 desired on the lens 10 and to a depth equal to the height desired of the bevel 11 on the lens 10 which, as stated hereinabove, would ordinarily be such as to cause the width of the base of the bevel 11 adjacent the flat part 13 of the lens edge to be substantially equal to or only slightly greater than the width of the groove or channel in the rim part of a spectacle in which the lens is to be mounted. At each side of the V-groove 33, the abrading wheel is formed flat. The wheel is mounted on the base 31 by means of a support 34 so as to cause the flat part of its outer portion to be disposed substantially parallel to the plane of the base 31 at its highest point away from the base 31, as shown in FIG. 10. Drive means in the form of a motor 35 and belt and pulley arrangement 36 (see FIG. 11) is provided to rotate the wheel 32 about its axis.

Rearwardly of the wheel 32, there is provided an upstanding pivot post 37 having its axis aligned rearwardly with the V-groove 33 of said wheel at its highest point away from the base and upon which is pivotally mounted a forwardly extending arm or head 38 which, at its forward end, is adapted to rotatably support and hold a lens 10 to be edged.

The head 38 is pivoted to the pivot post 37 by a transversely extending pin 39 so as to permit the forward end of the head 38 to be raised or lowered away from or toward the wheel 32 by pivoting about the pin 39 while, at the same time, being free to swing laterally relative to the wheel 32 by means of the pivot post 37. Thus, it can be seen that the head 38 is universally connected to the base 31 through the pivot post 37 so as to permit its forward end to be freely moved in all directions relative to the wheel 32. The forward end of the head 38 which is bifurcated at 40 is provided with a first lens supporting shaft 41 rotatably supported therein and a second shaft 42 coaxial with the shaft 41. Each of the shafts 41 and 42 are provided with lens-engaging pads 41a and 42a, respectively, at their adjacent ends between which the lens 10 is clamped and held securely in place by means of a tensioning spring 43 adapted to urge the shaft 41 towards the shaft 42. The shaft 42 extends outwardly through its adjacent side of the head 38 and is provided with a drive gear 44 which is driven by a motor 45 through a worm 46 and pinion 47 (see FIG. 11) to rotate the shaft 42, lens 10 and shaft 41 together as a unit when the lens 10 is firmly clamped between the shafts 41 and 42.

At the terminal end of the shaft 42, adjacent the gear 44, means is provided to receive a pattern or former 48 of a contour shape equal to that desired of the finally edged lens blank 10. Beneath the former 48 and mounted on a rigid bracket 49, which is fixed relative to the base 31 as shown, there is provided a shoe 50 upon which the outer peripheral edge of the former 48 rides and it can be seen that rotation of the shaft 42 by motor 45 will rotate the lens 10 and former 48 in unison so that the former 48 will cause the head 38 to rise or decline in accordance with the particular shape of the former thus moving the edge of the lens 10 away from or closer to the wheel 32 so as to ultimately duplicate the contour shape of the former on the lens at the completion of each 360° revolution of the shaft 42. In order to control the outer peripheral dimension of the lens 10 so as to produce a desired lens size, the shoe 50 is adjustable vertically in the support 49 by means of a slideway 51 and a depending shoe-supporting member 52 which is slidably fitted in the slideway 51. A laterally extending pin 53 is fixed to the shoe-supporting member 52 and extends outwardly through a vertical slot in the slideway 51 to be engaged by a rotatable cam member 55 at the end of an actuating spindle 56 which is supported by a bracket 57 fixed on the base 31. An operating knob 58 is fixed to the end of the spindle 56 opposite to the cam 55 and is provided with indicia 59 which indicates, by reference to a fixed pointer 60 on the bracket 57, the lens size to which the lens will ultimately be edged. Rotation of the cam 55 by the knob 58 will raise or lower the shoe 50 to position the axis of the shafts 41 and 42 further away from or closer to the adjacent abrading surface of the wheel 32 as desired to increase or decrease the finished size of the lens 10.

In operation, the lens 10 is clamped between the pads 41a and 42a of their respective shafts with its intended optical center aligned so as to be intersected by the axes of said shafts and the wheel 32 is rotated by motor 35 at a relatively rapid rate while the lens 10 is rotated slowly about the axes of the shafts 41 and 42.

When the edge of the lens 10 engages the wheel 32, as shown in FIG. 10, its edge will be abraded by the wheel 32 to the preformed shape of the outer edge of the wheel having the V-groove 33 therein.

In order to accurately locate one side of the bevel 11 on the lens edge in intersecting relation with the front or convex side 12 of the lens 10, as illustrated in FIG. 9, a cam arrangement is provided on the machine 30 for controlling the position of the lens edge relative to the V-groove 33.

This cam arrangement comprises a fixed cam-carrying member 61 attached to the support 49 (see FIG. 11). The cam-carrying member 61 has attached thereto, as by screws or the like 62, a cam or template 63 having a cam surface 64 (see FIG. 10) formed thereon. The cam surface 64 is of specific shape and is formed to a radius of curvature corresponding to the radius of curvature of the convex or front side 12 of the lens 10 to be edged.

The cam surface 64, during operation of the machine 30, is in engagement with a roller 65 carried by the arm 66 of an adjustable stop 67 which is pivotally connected at 68 to the head 38 of the machine. An adjusting screw 70 is provided to move the stop 67 about the pivot 68 in adjusting the device for a desired engagement by the cam surface 64.

By adjusting the stop 67 to move the head 38 of the machine laterally, the forward edge of the lens 10 (its convex side) is initially located to place the lens edge in the V-groove 33 of the wheel 32, as shown in FIG. 10, so as to cause one outer edge of the V-groove 33 to intersect the convex side of the lens whereupon during the edging operation, the cam surface 64, being of a shape corresponding to the shape of the front surface 12 of the lens 10, will cause the head 38 to move laterally to compensate for varying edge distances from the center of rotation of the lens during the bevelling thereof and to maintain this initial position of the lens in the V-groove throughout its entire 360° rotation thereby causing the apex of the bevel 11 on the lens 10 to follow adjacent the peripheral edge of the front surface of the lens, as shown in FIGS. 1, 2, 4 and 9 and one side of the bevel 11 to meet the convex side of the lens.

It is pointed out that since a greater amount of material is being removed from the side of the lens edge toward its convex surface, the head 38 of the machine will inherently be urged to the right as viewed in FIG. 10 and cause the roller to remain in firm engagement with the cam surface 64 at all times.

It is pointed out that various templates are provided to replace the template 63 when lenses having differently curved front surfaces are to be edged. That is, a template having a specific cam surface 64 is provided for each major change in front surface curvature of different lenses to be edged.

It has been found that lenses can be successfully edged with the lens edging machine 30 when the cam device 67 is disconnected. However, in this case, the machine 30 must be tilted 2 or 3 degrees by raising the right-hand side thereof, as viewed in FIG. 10, to counteract the above-mentioned tendency for the head 38 to force the lens 10 to the right, as viewed in FIG. 10. Alternatively, by shifting the axis of the pivot post 37 sidewise slightly to the right from its illustrated location directly behind the point of contact of the lens with the V-groove 33 of the wheel 32, as viewed in FIG. 10, the machine 30 may be maintained level as illustrated. By either of these methods, the natural tendency for the head 38 to move to the right will be counteracted sufficiently to cause the edge of the front surface edge of the lens 10, once started in a position such as shown in FIG. 10, to follow the adjacent edge of the V-groove 33 in the wheel and form the bevel 11, as described above and shown in FIGS. 1, 2, 4 and 9.

Figure 12:
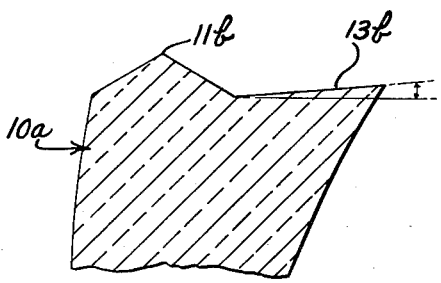
FIG. 12 is a fragmentary view of a slight modification of the invention.

In FIG. 12 there is illustrated a slight modification of the invention wherein the flat edge surface 13b of the lens 10a instead of being formed parallel with the optical axis of the lens is inclined slightly outwardly away from the axis of the lens approximately 4½° as diagrammatically illustrated. This is accomplished by dressing the effective abrading surface of the abrading wheel 32 of the machine 30 as to form the flat portion thereof tilting downwardly at an angle of approximately 4½° from a normal to a line bisecting the angle of the V-groove 33.

In so doing, the machine 30 may be operated without the use of the cam device 67 and without being tilted 2 or 3 degrees as described above. The approximate 4½° incline of the flat portion of the abrading surface of the wheel 32 will provide sufficient drag on the lens adjacent its concave side to overcome the above-mentioned tendency for the head 38 thereof to force the lens to the right (as viewed in FIG. 10) and thus, the apex of the bevel 11b of the lens 10a will automatically be formed adjacent and substantially equidistant from the front or convex side of the lens 10a throughout the major portion of the periphery of said lens.

It is pointed out that if it is desired to provide slightly more clearance for the adjustable lens pad supporting arms 18a of the spectacle frame 18, the flat edge part 13 of the lens 10 may be slightly inclined toward the axis of the lens an amount which will ultimately produce only a negligible light-diffusing band about the lens edge inwardly of the base of the bevel 11. This is accomplished by merely slightly tilting the axes of the clamp shafts 41 and 42 relative to the flat abrading surface portion of the wheel 32 or vice versa by slightly tilting the flat surface portion of the wheel relative to the longitudinal axis of the clamp shafts 41 and 42 or by dressing the effective flat abrading portion of the wheel so as to slightly incline the same in accordance with the degree of inclination desired of the flat edge surface 13 of the lens 10.

With applicant's invention, when the mounting is in position of use before the eyes of the wearer and regardless of the thicknesses of the edges of the lenses, the related characteristics of the lens rims of the lens supporting mounting and the beveled edges of the lenses will be identical in appearance. This is further of extreme importance from the aesthetical point of view in instances when the corrective lens for one eye of an individual is of a much stronger minus power than the corrective lens for the other eye, as with the present invention they may be matched in appearance as contrasted with the prior art type of bevel used on such lenses wherein the stronger powered lens would appear as having a much wider light-diffusing band surrounding the edge thereof than the band of the lens of weaker power.

While the width of the base of the beveled edge portion of the lens of the invention has been described above as being substantially equal to the width of the channels of the rims, it is to be understood that the inner edges 72 of the rims are slightly rounded so as to engage the beveled surfaces of the lenses at locations spaced slightly inwardly from the lowermost edges of said surfaces. This provides a clearance between the flat surface 13 and the rims to insure that the rims will properly seat on the beveled surfaces of the lens.

From the foregoing, it can be seen that a simple, efficient and economical method has been provided for accomplishing all of the objects and advantages of the invention as expressed in the accompanying claims. However, the invention is not limited to the exact matters shown and described as only the preferred matters have been given by way of illustration.

Having described my invention, I claim:

1. A lens of the character described having finished surfaces of different radii of curvature on the front and rear faces thereof and having its peripheral edge contoured to a pre-controlled shape other than circular with the result that certain portions of said edge are thicker than other portions thereof, said edge embodying an outwardly projecting inverted V-shaped bevel part located with a side thereof disposed adjacent the finished front face of said lens, the height of said side of said bevel part and width of the base thereof being respectively of substantially uniform dimensions at all points about the major portion of the periphery of said lens, said peripheral edge having an additional substantially flat rearwardly extending surface portion which deviates from parallelism with the axis of said lens by an amount no greater than approximately 4½°, said substantially flat surface portion extending rearwardly immediately from the base of said bevel part to the finished rear face of said lens and being integral with said bevel part throughout the major portion of the periphery of said lens and said finished front and rear faces being of substantially the same peripheral contour shape and size.

2. A lens of the character described having finished front and rear faces of different radii of curvature and having a peripheral edge contoured to a precontrolled shape other than circular with the result that certain portions of said edge are thicker than other portions thereof, said edge embodying an outwardly projecting inverted V-shaped bevel part, the major portion of which is located forwardly of a line lying centrally and extending circumferentially of said edge of said lens, the height of said bevel part and width of its base being respectively of substantially uniform dimensions about the major portion of the periphery of said lens, said edge having an additional substantially flat rearwardly extending surface portion which deviates from parallelism with the axis of said lens by an amount no greater than approximately 4½°, said substantially flat surface portion being integral with said bevel part and extending immediately from the base of said bevel part to the finished rear face of said lens and said finished front and rear faces being of substantially the same peripheral contour shape and size.

3. A lens of the character described having finished front and rear faces of different radii of curvature and having a peripheral edge contoured to a precontrolled shape other than circular with the result that certain portions of said edge are thicker than other portions thereof, said edge embodying an outwardly projecting inverted V-shaped bevel part, the major portion of which is located forwardly of a line lying centrally and extending circumferentially of said edge of said lens, said bevel part having an apex and a first inclined side of substantially uniform width extending from said apex into intersecting relation with said finished front face of said lens about the major portion of the periphery thereof, said beveled part having a second inclined side extending from said apex generally toward said finished rear face of said lens, said second inclined side of said bevel part being integral with a substantially flat rearwardly extending surface portion on said edge of said lens which flat surface portion deviates from parallelism with respect to the axis of said lens by an amount no greater than approximately 4½° and intersects said finished rear face of said lens and said finished front and rear faces being of substantially the same peripheral contour shape and size.

References Cited in the file of this patent

UNITED STATES PATENTS

| | | |
|---|---|---|
| 1,918,999 | Wells | July 18, 1933 |
| 1,933,988 | Lewis | Nov. 7, 1933 |
| 2,174,304 | Anderson et al. | Sept. 26, 1939 |
| 2,284,524 | Kimmel | May 26, 1942 |
| 2,855,734 | Gursch | Oct. 14, 1958 |
| 2,868,075 | Bivens | Jan. 13, 1959 |

FOREIGN PATENTS

| | | |
|---|---|---|
| 739,493 | Great Britain | Nov. 2, 1955 |
| 1,148,644 | France | June 24, 1957 |

OTHER REFERENCES

"Manufacturing Optician," vol. 10, December 1956, article on pages 133–136; page 135 especially cited.